Feb. 27, 1923.

O. L. LEWIS.
FARM TRACTOR.
FILED JULY 28, 1920.

INVENTOR.
Otto L. Lewis

Patented Feb. 27, 1923.

1,446,913

UNITED STATES PATENT OFFICE.

OTTO LEROY LEWIS, OF HOUSTON, TEXAS.

FARM TRACTOR.

Application filed July 28, 1920. Serial No. 399,599.

*To all whom it may concern:*

Be it known that I, OTTO LEROY LEWIS, a citizen of the United States, and a resident of Houston, in the county of Harris and State of Texas, have invented a new and useful Improvement in Farm Tractors, of which the following is a specification.

My present invention relates generally to farm tractors and more particularly to a tractor of the front wheel drive type and the primary object of the invention is the provision of an improved tractor of this nature capable of pulling agricultural implements, vehicles and the like and adjustable to provide the required overhead clearance for orchard cultivation permitting its ready passage beneath overhanging branches of trees, as well as underneath clearance permitting of its use in the cultivation of growing crops, particularly the final cultivation of high growing crops such as corn, cane, cotton and the like.

In carrying out my invention and providing an apparatus adapted to fulfill the general objects just above stated, I employ a machine one of the main features of which consists in providing two front drive wheels which may be conveniently raised or lowered together as well as independently of one another with respect to the body of the tractor and two rear supporting wheels which may not only be conveniently raised or lowered together and independently of one another, but may also be shifted toward and away from one another. These features coact to make it possible to secure desired clearance underneath the machine in the cultivation of tall crops and to bring about the necessary overhead clearance when using the tractor in orchard cultivation. It is also possible to run the wheels at one side in a previously formed furrow when plowing while the wheels at the other side move on unplowed ground in order to promote easy steering and the same time maintain the entire machine generally level. The relative adjustment of the rear wheels toward and away from one another furthermore permits of increase in stability of the tractor especially desirable when the machine is working in elevated position.

Another feature of the invention resides in the effective support of the motor and its frame in such a way as to avoid all obstacles to underneath clearance and efficiently operate in connection with a multi-cylinder motor providing for ample power for all operations to which it is likely the machine will be put.

Still another important feature of the invention resides in the means by which either side of the front or rear end of the tractor may rise or fall in passing over an elevation or depression without affecting the other side or other end or straining the frame and without endangering tilting or tipping of the machine at any point to an undesirable extent.

In general the tractor proposed by my invention has an internal combustion engine mounted at the front and supported and suspended by certain novel connections and means including a frame bolted at its rear to a transmission case. At the opposite sides of the transmission case are radially swinging arms, depending therefrom, which support the forward driving wheels and which also carry the driving connections by means of which these wheels are rotated. At the upper and lower portions of the transmission case are swivel connections with a yoke frame, permitting the transmission case, driving connections, front drive wheels, engine and engine support to be rotated horizontally while at the same time held against vertical movement relative to the yoke frame. This rotation for steering purposes is accomplished through certain means including connections which extend rearwardly to and within convenient reach of the operator's station, along with controlling connections for gear and clutch shifting means, brake and throttle. The support or frame of the machine also includes a torque member attached to the yoke frame at its forward end and to a rear frame at its rear end, which latter provides proper support of the two rear supporting wheels with their adjustable connections.

With this general outline it is believed the following description will be better understood and may be readily followed in its reference to the accompanying drawings which illustrate the invention and form a part of this specification, and in which

Figure 14 is a detail of certain parts of the gear shifting mechanism detached from the transmission case, Figure 14[a] is a detail horizontal section through certain parts of the clutch-operating and gear-shifting device, Figure 14[b] includes a side and end view of the segmental gear of Figure 14[a], Figure 14[c] is an enlarged top plan view of a portion of the bushing shown in Figure 14[a].

Referring now to these figures and particularly to Figures 1 to 6 inclusive, my invention proposes in the first instance an internal combustion motor indicated generally at 1, which may be of any suitable type and the supports of which as I will now describe provide for considerable variation as to size, number of cylinders, etc. The motor is securely fastened within a rearwardly opening U-shaped frame 3, at its front end by means of a forward cross-beam or strip 2 which parallels the forward cross-bar of the frame in spaced relation. This forward cross-bar of the frame also supports the radiator 4 to the upper portion of which is fastened the forward portion of the motor cover 5 connected at its rear end to the fuel tank 6. This tank is located slightly to the rear of the motor 1 and is supported in elevated position above the motor by brackets 7 secured to and upstanding from the rear supporting member 8 of the motor 1, which with the rear end of the motor is securely fastened to the forward portion of the transmission case 9 by bolts 10. The rear ends of the extensions of the U-shaped frame 3 are securely bolted to the forward side portions of the transmission case 9 by bolts 12 as seen particularly in Figures 1 and 5 and have securely fastened thereto intermediate their ends laterally outstanding brackets 14 to which are rigidly and adjustably secured the lower forward ends of a truss rod 13 whose extensions project forwardly and downwardly at angles over lugs 11 carried by the upper side portions of the rear motor supporting member 8. Intermediate its ends this truss rod which is generally of V-shape is looped around a stud 15 upstanding from the forward portion of the transmission case 9 and from which its extensions project in approximately a horizontal plane to the lugs 11, the latter being thus utilized substantially as struts, whereby the strain of support is equalized and the motor frame 3 effectively supported without the necessity of under frame connections, the effect of which would be to curtail underneath clearance of the machine.

Among other things supported by the transmission case 9 is an upper laterally projecting shaft to be hereinafter referred to, carrying a belt pulley 16 which is exposed in order to provide for taking the power from the machine for external purposes, and in addition to this pulley 16 at one side, the transmission case supports at each side a depending drive wheel supporting arm or frame 17 from which each of the forward drive wheels 18 is adjustably supported and driven. This latter mechanism is well illustrated in Figure 7, the section of which is taken approximately along the line 7—7 of Figure 1, and from which it will be noted that each side of the transmission case forms a rigid support as indicated at 59, apertured to receive the inner portion of a connecting cylinder 58 in rotatable relation.

Figures 7, 8:
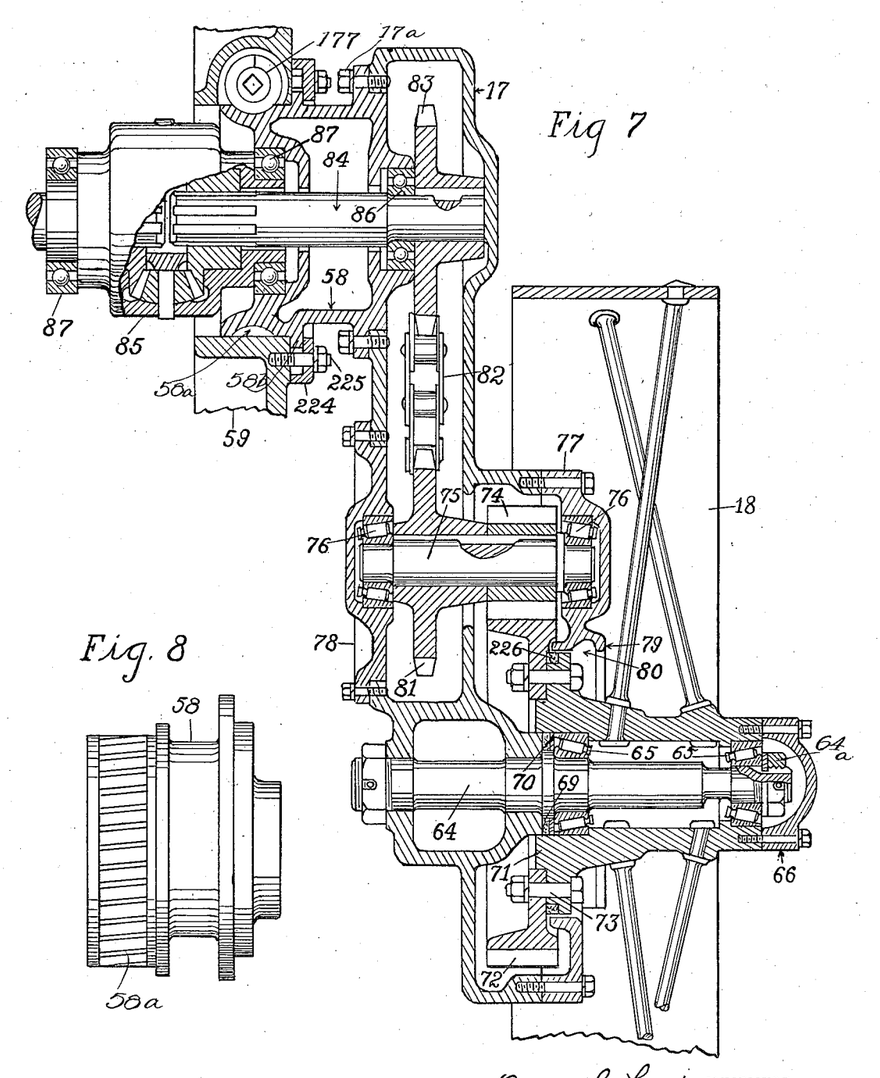
Figure 7 is a vertical transverse section through a portion of one front drive wheel, its supporting connections and driving means.
Figure 8 is a detail side view of the rotatably adjustable connecting cylinder of Figure 7.

The transmission housing also includes therein a differential case 85 from which differential shafts 84 extend and which differential case has rotatable bearings, preferably anti-friction bearings as indicated at 87 one within the inner end of the adjacent connecting member or cylinder 58 of Figure 7. Each differential shaft 84 projects outwardly through the respective connecting cylinder 58 and has an anti-friction bearing 86 in the outer end of the connecting cylinder adjacent to a sprocket wheel 83 secured on the outer end of the shaft within the upper or inner ends of the wheel supporting arm 17.

The inner end of each connecting cylinder 58 is moreover provided with a worm gear 58$^a$, engaged by means of an adjusting worm 177 journaled in the side wall 59 of the transmission housing, and each connecting cylinder 58 is furthermore provided with an annular rib or flange 58$^b$ enclosed in rotatable relation within a confining ring 224 secured by bolts 225 to the transmission housing.

The upper end of each wheel supporting arm or frame 17 is open at one side to receive the outer end of its respective connecting cylinder 58 to which it is rigidly connected by bolts 17$^a$ so that the entire arm may thus swing on the axis of the differential shaft 84 by virtue of the rotatable connection and of the connecting cylinder with the transmission housing and under control of the gear connections 58$^a$ and 87.

Intermediate its ends each wheel supporting arm or frame 17 is preferably provided with a sprocket shaft 75 having a sprocket wheel 81 thereon connected by a sprocket chain 82 with a sprocket wheel 83 of its differential shaft. Shaft 75 preferably has bearings 76 at its opposite ends, the inner bearing 76 being supported within an inner cap plate 78 securely bolted to the arm or frame and the outer bearing 76 being similarly supported in the upper or inner portion of a cap plate 79 having below the bearing 76 an enlarged opening 80 which receives the inner flanged portion of the hub 71 of the respective wheel 18. Shaft 75 is also provided with a gear 74 thereon which meshes with a gear 72 secured upon the inner face of the hub by bolts 73.

Adjacent to its lower or outer end each wheel supporting frame or arm 17 has a bearing portion through which the inner end of the wheel supporting shaft 64 is securely fastened and the outer portion of which bearing is telescoped by the inner end of the wheel hub 71. On the outer portion of the shaft 64 constituting a spindle and secured by a locked nut 64$^a$ enclosed within a dust-excluding cap 66, the wheel hub 71 has bearings 65, between the inner bearing of which and the adjacent hub supporting portion of the frame or arm 17 are preferably included felt and metal washers 69 and 70 so that the bearings 65 are thus effectively protected against the entrance of foreign matter and the hub may be filled with grease or other lubricant at all times. It thus becomes evident that each front wheel 18 is driven through connections housed by the supporting arm or frame 17 thereof, from its respective differential drive shaft 84, and that by virtue of this arrangement each drive wheel may be swung either together with the opposite wheel, or independent thereof, between the positions shown in full and dotted lines in Figure 1.

At the rear of the transmission case 9 is an upright yoke frame 20, the lower forwardly extending portion 20$^a$ of which is pivotally connected to the lower portion of the transmission case by means of a plate 21 securely bolted to the transmission case and provided with a hollow pivot stud 21$^a$ depending into a receiving socket therein and apertured at its lower end so as to provide for movement of lubricant downwardly from the transmission case and around the pivot stud and thoroughly lubricate this connection. This construction is clearly shown in the lower portion of Figure 9 and it will be observed that the lower end of the opening of the portion 20$^a$ of the yoke member is closed by an expansion plate 134 so as to effectively retain the lubricant around the pivot joint and the upper surface of the portion 20$^a$ has an annular groove around the stud 21$^a$ holding a felt or similar washer 135 which presses upwardly against the plate 21.

Figure 1:
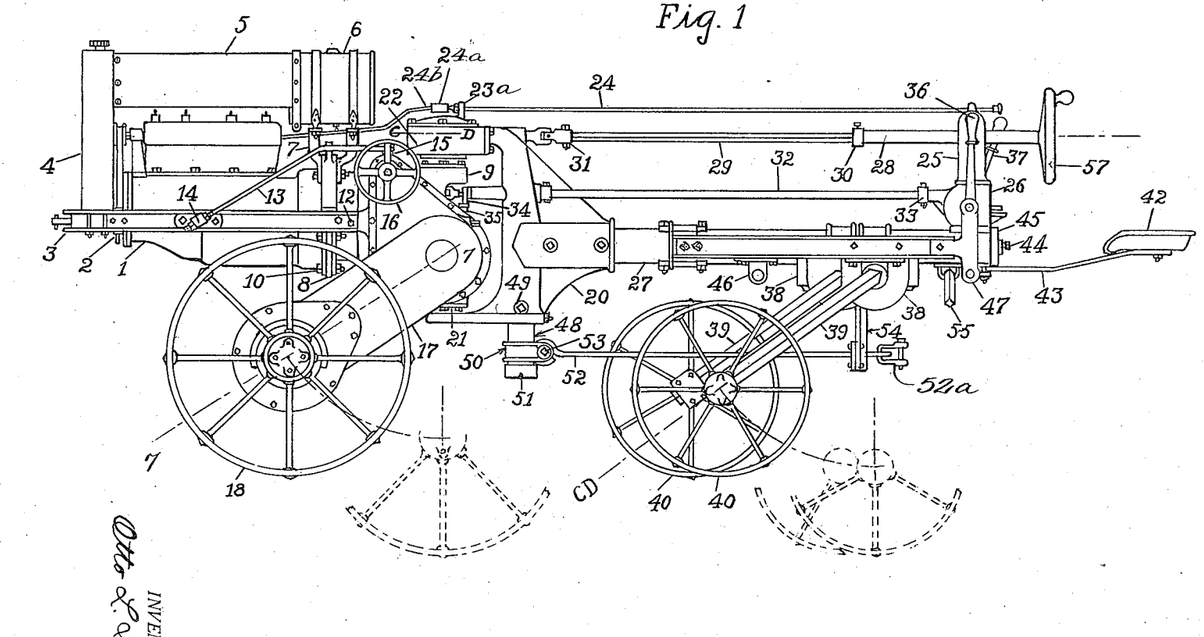
Figure 1 is a side elevation of the complete machine.
Figure 13:
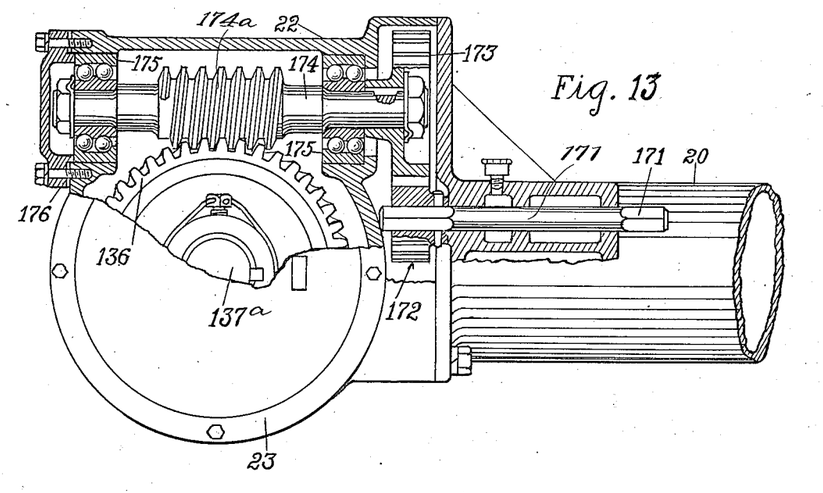
Figure 13 is a top view, partly broken away and in section, constituting a detail of the steering means.

The upper forward portion of the yoke member is constituted by a steering gear housing 22, having a cover 23 and enclosing a worm wheel 136 secured upon the upper end of a post 137$^a$ rising from a plate 137 securely bolted to the top of the transmission case 9. This post 137$^a$ extends vertically through a bearing ring 138 securely bolted to the lower surface of the steering gear housing 22 and containing anti-friction bearings 139 around the post below the worm wheel 136. At one side, the steering gear housing 22 has bearings 175 as plainly seen in Figure 13, supporting a shaft 174 having a worm 174$^a$ in engagement with the worm wheel 136, one extended end of shaft 174 having a gear wheel 173 secured thereon and engaged by a gear 172 upon the forward end of the stud shaft 171, which latter has a bearing in the upper portion of the yoke member 20 and has a rear exposed and squared end for connection by a universal joint 31 as seen in Figure 1 to the forward end of a steering rod 29. The rear end of this rod extends within a forward clamp 30 of a rear steering shaft 28 having at its extreme rear end a steering wheel 57 located forwardly of and above the operator's seat 42, and it is thus obvious that upon movement of the steering wheel 57 in either direction rotation will be communicated through the steering rod 29 and through gears 172 and 173 and again through worm 174ª and worm wheel 136 to the steering post 137ª so as to shift the entire forestructure including transmission case, engine support and front drive wheels, it being noted that the post 137ª is in vertical alinement with the lower pivot 21ª of the yoke member 20 as clearly seen by reference to Figure 9.

The rear portion of the steering shaft 28 is rotatably supported in a bearing 191 of an upright steering wheel support 25 and this steering wheel support, in turn mounted upon the upper end of a rear control box 26, is provided at its upper end with a lug 25ª through which the rear end of the throttle control rod 24 is journaled. This control rod extends forwardly in parallel vertically spaced relation with respect to the steering rod 29 and has its forward end fastened through an upstanding lug 23ª of the cover 23 of the steering gear housing, forwardly of which throttle control rod 24 is connected by a universal joint 24ª with a rod 24ᵇ which extends forwardly to the carbureter (not shown).

The control box 26 just above referred to is rigidly secured upon the upper portion of the rear end of a central longitudinal torque and frame beam 27 whose forward end is rigidly bolted to the steering yoke 20. The rear end of this torque member 27 supports a seat bar 43, and its most important function is the support of a rear rectangular frame 62 having front and rear braces 60 and 61 rotatably engaging the torque member respectively at an intermediate point and adjacent to its rear end. At lengthwise spaced points upon the torque member 27 and within the frame 62 are collars 63 one of which is shown in detail in Figures 16 and 17, each collar having a lower clamp 63ª including an inner rotatable sleeve 192 having a squared socket for the reception of the squared inner end of one of the angular supporting bars 39 of the rear supporting wheels 40. As will be seen in Figure 2 the outer portions of these bars turn downwardly beyond the side bars of the frame 62, the latter being each provided with a rigid gear box 38 rotatably holding and supporting a worm wheel 200 having a squared axial bore 200ª through which the wheel supporting bar passes. Each gear box 38 also has a vertically disposed and rotatable worm shaft 197 retained therein in rotatable relation by virtue of a pin or bolt extending through a hole of the box and partially within an annular groove 198 of the said shaft. The shaft is provided with a polygonal external end to receive a wrench and its body is squared or polygonally shaped within the gear box to receive a worm 199, the latter of which engages the worm wheel 200. By reference to Figure 18 in particular it will be noted that the worm wheel 200 bears against a portion of the housing 38 at 201 and that the hub of the gear has bearing in the gear housing and is retained by a cap 202 connected to one end thereof by bolts 203 and adjustable by these bolts so that the gear 200 may be drawn tightly against the housing 38 along the face 201. The opposite side of the gear box is closed and protected by a cover 204 and it is obvious from this arrangement that by simply loosening the clamping bolts 194 of Figures 16 and 17 and then rotating the worm shafts 197, the supporting wheels 40 may be swung upwardly or downwardly with respect to the frame between the positions shown in full and dotted lines in Figure 1.

Figure 9:
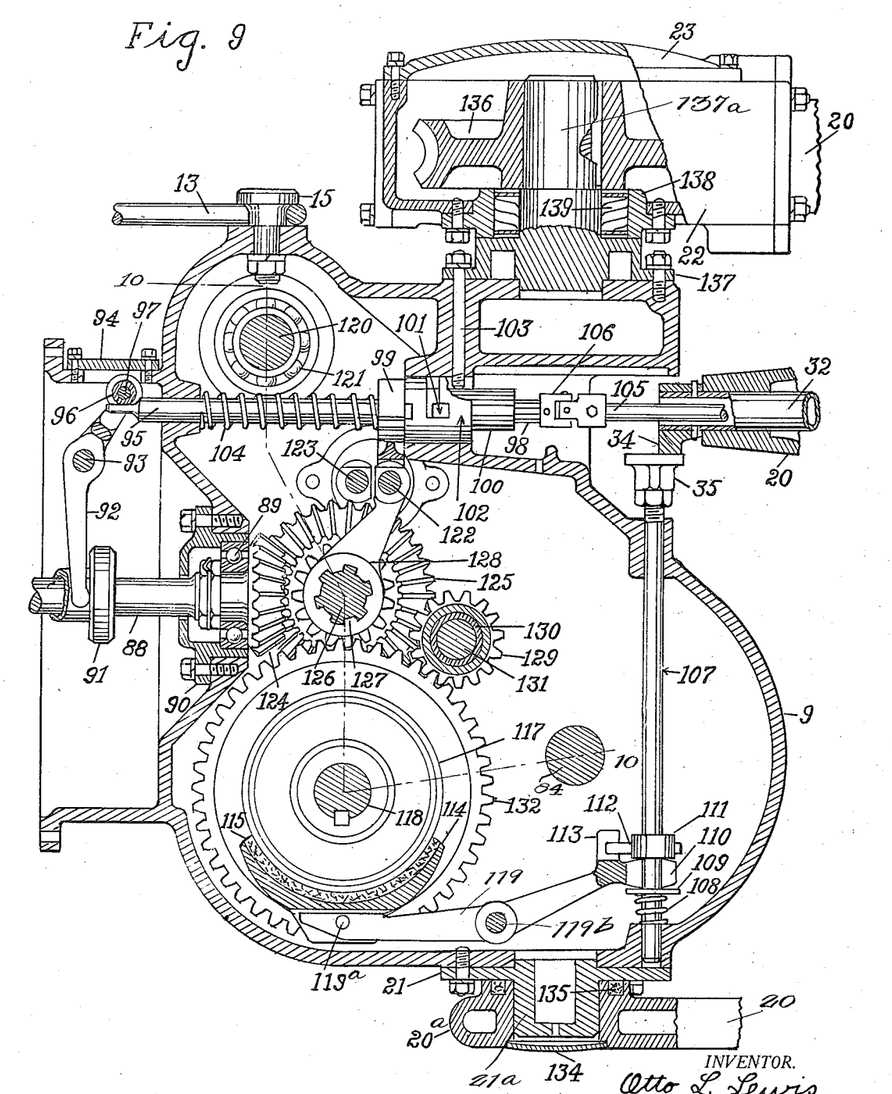
Figure 9 is a vertical longitudinal section through the transmission case and adjacent parts.

Power is taken in the first instance from the fly wheel (not shown) of the motor to a shaft 88 as seen in Figure 9, engageable with the fly wheel by means of the ordinary or usual fly wheel clutch, the rear end of shaft 88 extending into the forward portion of the transmission housing 9 and having an anti-friction bearing at 89 in a bearing support 90 attached to a portion of the housing. The clutch above mentioned is controllable by a clutch throw-out collar 91 on the shaft 88 engaged by a clutch throw-out yoke 92 pivotally mounted upon a cross shaft 93 and provided with an upper transversely disposed roller 96 mounted on a cross pin 97. Beneath this roller, and beneath a removable cap 94 of the upper forward portion of the transmission housing through which access may be had for adjusting the clutch, extends the forward reduced end of a lengthwise movable shaft 95 mounted to slide and rotate lengthwise through the upper portion of the transmission housing and connected at its rear end by a universal joint 106 with the forward end of a shaft 105 whose lengthwise movements thus control the clutch.

Figure 2:
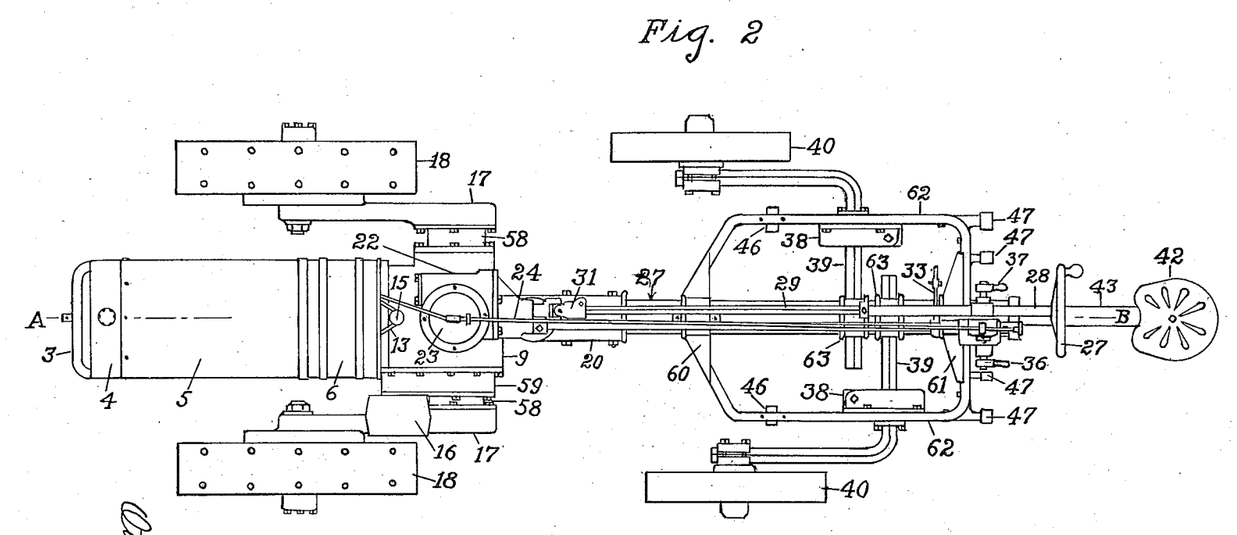
Figure 2 is a top plan view thereof.
Figure 3:
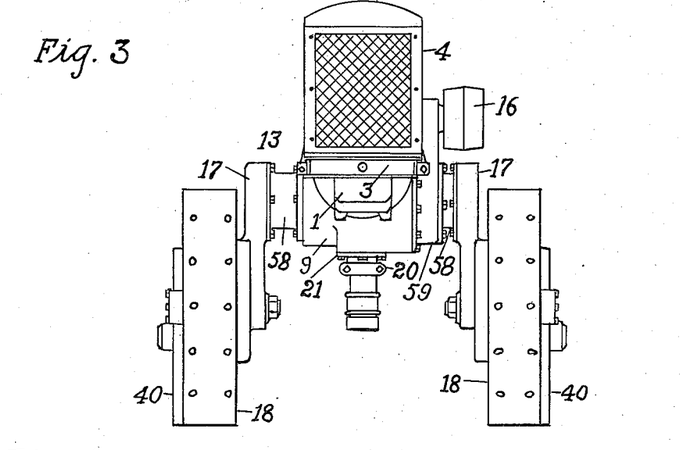
Figure 3 is a front elevation.
Figure 4:
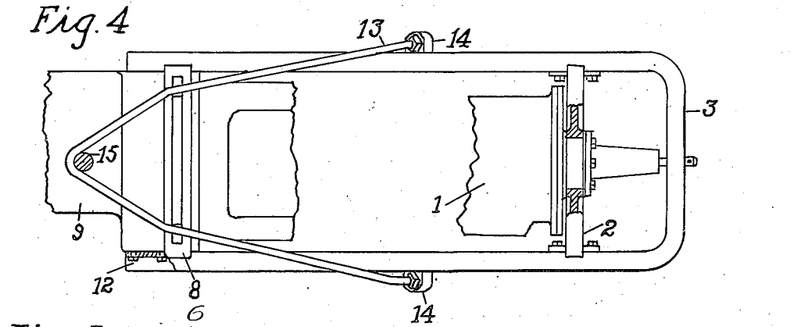
Figure 4 is a top plan view of the forward portion with certain parts broken away and in section, illustrating more particularly the motor suspension means.
Figure 5:
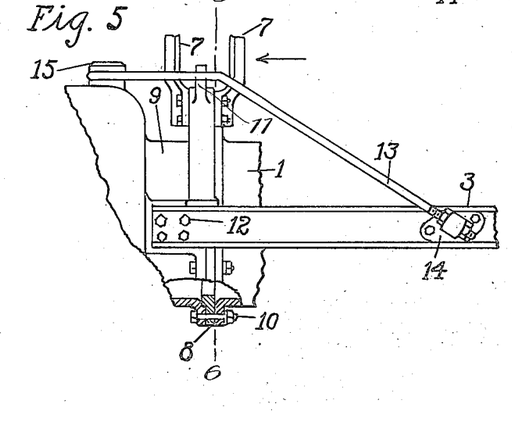
Fig. 5 is a side elevation of certain portions of Figure 4, parts being broken away and in section.
Figure 6:
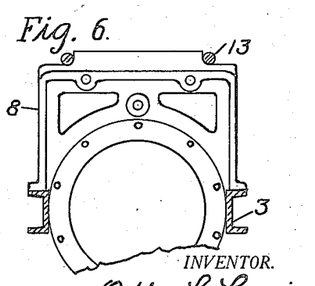
Figure 6 is a vertical transverse section taken substantially on the line 6—6 of Figure 5.
Figure 15:
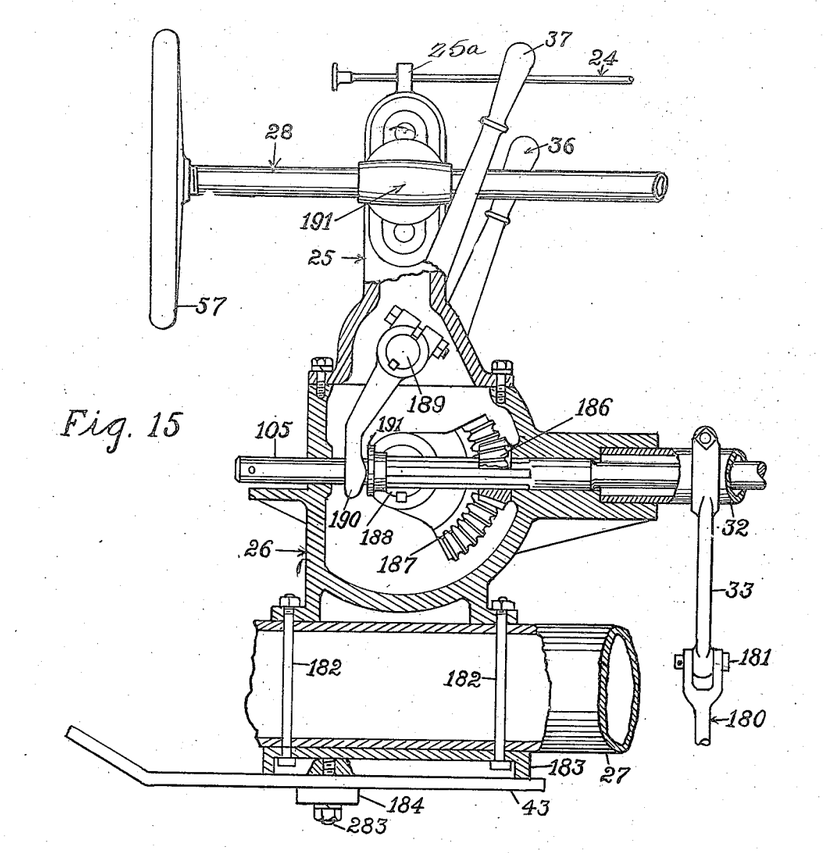
Figure 15 is a vertical section through certain of the manual controlling connections.

This shaft 105 projects rearwardly through a tube 32 which will be hereinafter referred to and its rear end is slidably and rotatably mounted in the control box 26 before referred to and as shown in Figure 15, a collar 191 on the rod within the control box providing for its lengthwise shifting movement under actuation of the shifter arm 190 in the control box clamped to a shaft 189 which latter is rotated in order to actuate the shifter arm 190 by means of a hand-lever 37 upstanding at the right-hand side of the control box looking forwardly as seen in Figure 2.

Figures 14, 14A, 14B, 14C:
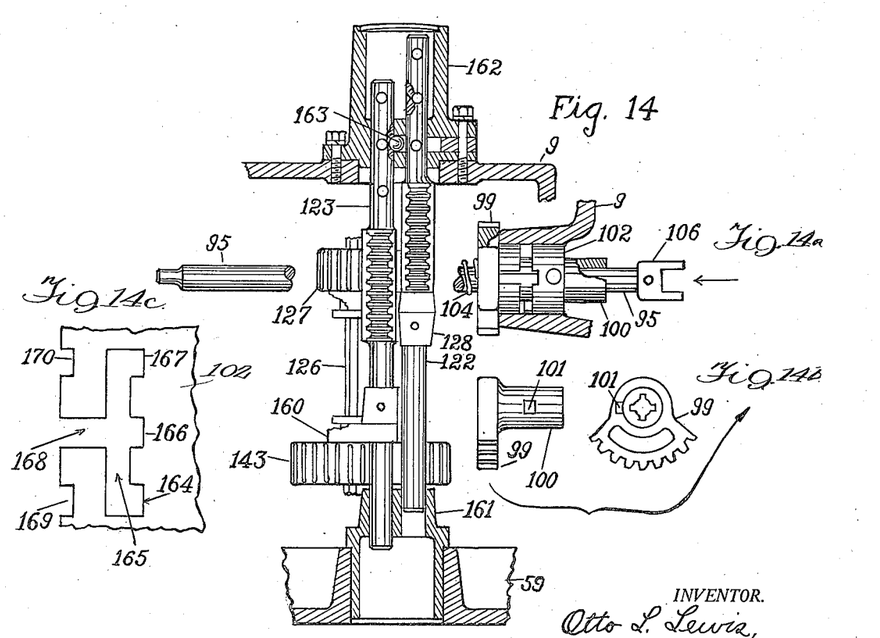

Splined upon a portion 98 of the rod 95 as seen in Figure 9 is the hub 100 of a segmental gear 99, said hub and its gear being clearly shown in Figure 14ᵇ. The hub 100 has a squared projection 101 which projection is movable in channels 165 and 168 of a bushing 102 securely held within the transmission housing by a bolt 103 and within which the hub 100 is slidable lengthwise and oscillatable. The channels 165 and 168 are respectively disposed circumferentially of the bushing 102 and lengthwise thereof through its forward edge as seen particularly in the enlarged detail partial plan view of Figure 14c of this bushing wherein it will be noted that along the rear side of the channel 165 the bushing has notches 164, 166 and 167, notch 166 being opposite the lengthwise channel 168. In its forward edge the bushing also has notches 169 and 170 respectively opposite the notches 164 and 167. The forward end of the universal joint 106 is so spaced from the rear end of the hub 100 of segmental gear 99 that when the rod 105 is pressed forwardly to shift the clutch collar 91, continued forward movement to the limit of movement of lever 37 will cause the universal joint 106 to engage the hub 100 and shift the latter forwardly a sufficient distance to move the hub projection 101 out of either of the notches of the bushing 102 in which it may have been seated, and wherein it is held under normal circumstances by the tension of spring 104 around the rod 95 between the front wall of the transmission housing and the segmental gear 99. Thus upon forward shifting of rod 105, the clutch is disengaged and the segmental gear projection at the same time moved so that it is free for oscillation. To effect this oscillation rod 105 is rotatable in addition to its lengthwise movement and this rotation is brought about by virtue of a bevel gear 186 splined upon its rear portion within the control box 26 as shown in Figure 15 and engaged by a segmental gear 187 secured upon a shaft 188 the latter of which is journaled through the left-hand side of the gear box and has secured thereon a shifting lever 36, the splined connection of gear 186 permitting of lengthwise movement of rod 105 in respect thereto.

The segmental shifting gear 99 of Figures 9 and 14a is movable to engage either of a pair of gear shifting rods 122 and 123 journaled at their opposite ends in bearings 161 and 162 of the transmission housing and extending transversely of the housing as particularly shown in Figures 9 and 14. Each of these rods has an upper rack face with which the segmental gear 99 is engageable, the latter being shiftable from the rearmost rod 122 to the foremost rod when the projection 101 of hub 100 moves through the channel 168 of bushing 102, and inasmuch as this channel 168 is opposite the neutral notch 166 it is obvious that each of the gear shifting rods 122 and 123 must be neutrally positioned before the segmental gear 99 can engage and move the other into a selected gear position. The bearing 162 at one end of the shifting rods 122 and 123 is preferably provided with a ball 163 to cooperate with notches of the rods disposed opposite the ball when the rods are in neutral position, this ball simply coacting with the notch of each rod when the latter is in neutral position to avoid danger of accidental displacement.

Figures 10, 11:
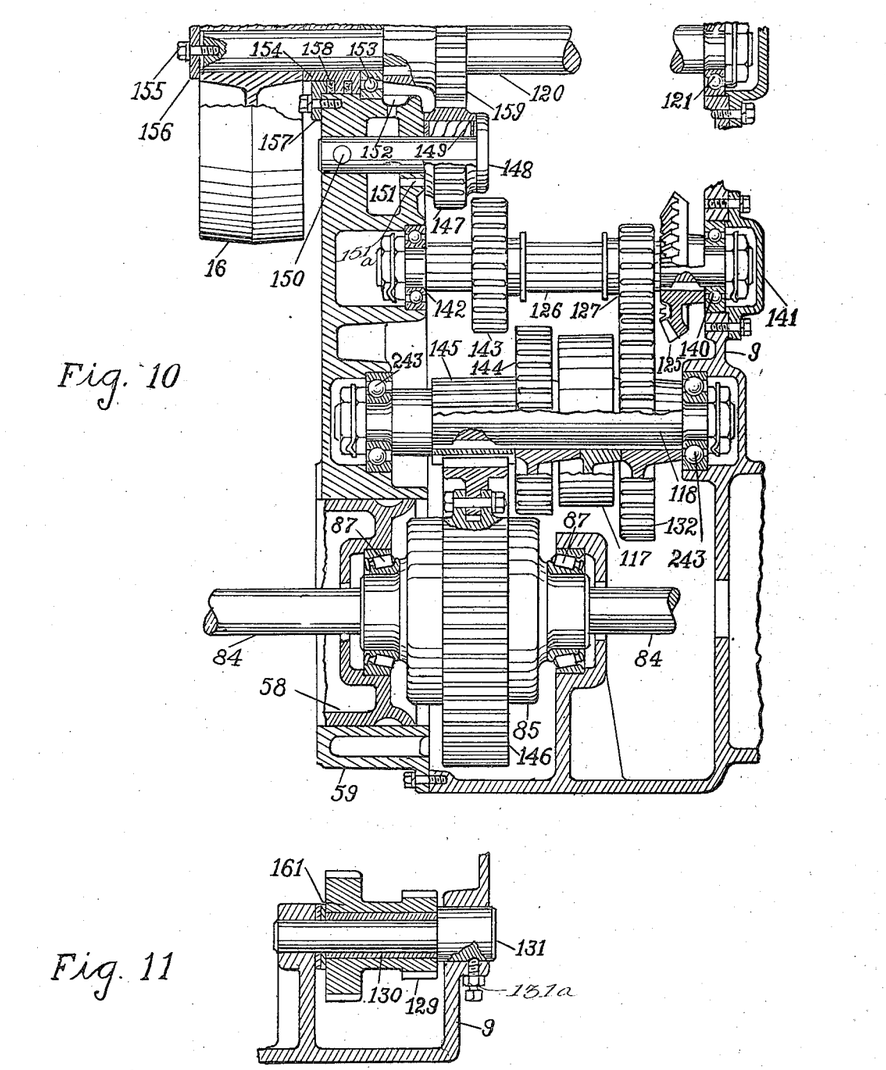
Figure 10 is a vertical transverse section taken substantially on the line 10—10 of Figure 9.
Figure 11 is a detail section through the reversing gear arrangement.

Below the gear shifting rods 122 and 123 as seen in both Figures 9 and 14 and also illustrated in Figure 10 is a shifting gear shaft 126 journaled at its opposite ends in bearings 140 and 142, the former of which is closed at one side of the transmission housing by a cap 141. On this shaft 126 is secured a bevel gear 125 which permanently meshes with a bevel gear 124 of the clutch shaft 88; also on the shaft 126 are two splined gears 127 and 143, the former of which is controlled in its movement lengthwise of shaft 126 by a shifter arm 128 secured to and depending from the shifting rod 122. Splined gear 143 is controlled in its shifting movement on shaft 126 by a shifting arm 160 depending from the shifter rod 123. Parallel with and below the shifting gear shaft 126 is a jack shaft 118 mounted at its opposite ends in bearings 243, this jack shaft having securely fastened thereon laterally spaced gears 132 and 144 respectively engageable by the splined gears 127 and 143 and also having secured thereon a gear 145 permanently in mesh with a gear 146 secured to the before-mentioned differential case 85 as plainly seen in Figure 10. At the rear of the vertical plane of the shafts 126 and 118 and between the latter, a reversing gear shaft 131 is secured in a portion of the transmission housing 9 by means of a locked set screw 131a and on this shaft is a bearing sleeve 130 carrying connected rotatable gears 129 and 161, the former of which is permanently in mesh with the jack shaft gear 132 and the latter of which is free for engagement by the splined gear 127, the latter of which is therefore movable between a low gear position in engagement with gear 132 as seen in Figure 10, and a reverse gear position in engagement with a gear 161, respectively upon opposite sides of the neutral position and controlled in such movement by the operation of shifting rod 122 when the shifting gear projection is respectively in the notches 164, 167 and 166 along channel 165 of the bushing 102.

Splined gear 143 in one position is engageable with jack shaft gear 144 and when so engaged completes the high gear position parts and is also movable on the shaft 126 to engage an idle gear 147 mounted on bearings 149 of a shaft 148 securely fastened in a portion of the transmission housing by a pin 150, this stub shaft passing through an oil compartment 151 in connection with the bearing 149 by a small channel 151ª and fed from a catch basin 152 into which the oil splashes during movement of the gears. Idle gear 147 is permanently in mesh with a gear 159 of the shaft 120 of the belt pulley 16 previously mentioned. Shaft 120 has a bearing 121 seen in Figure
10 10 at one side of the transmission housing and a bearing 153 adjacent its opposite end in the opposite side of the housing with a sleeve 154 supporting felt rings and the like 158 constituting washers engaged and held in place by a clamping ring 157 attached to the housing. On the external portion of the shaft 120 belt pulley 16 is held by an end cap 156 attached to the shaft end by an adjusting screw 155 which operates to hold the bearing 153 rightly in place.

Shifting gear shaft 126 being permanently in rotative engagement in operation with the clutch shaft 88 and jack shaft gear 145 being also permanently engaged with the gear 146 of the differential 85 through rotation of which the differential shafts 84 forming the drive shafts of the two front wheels, are rotated, it is obvious that with the gearing as shown in Figure 10, low speed is applied through splined gear 127 and jack shaft gear 132. At this time the shifting gear projection 101 is in the low speed notch 164 of bushing 102. Whenever gears are to be changed the unusual lengthwise movement of rod 105 must take place in order to shift the gear hub 100 forwardly against the tension of spring 104 in order to displace the same from the bushing notch in which it has been previously held by the tension of the spring and thus preceding each gear shifting operation the clutch is first thrown out.

In addition to the gears 132, 144 and 145, the jack shaft 118 has secured thereon between gears 132 and 144 a brake drum 117, against the lower portion of which a brake shoe 114 with its lining 115 is vertically shiftable. This shoe is compensatingly pivoted at 119ª upon the forward end of an intermediately pivoted brake lever 119 whose pivot appears at 119ᵇ in Figure 9. The rear end of this brake lever which is located within the transmission housing is bifurcated to receive the lower portion of a vertically shiftable rod 107 around which a spring 108 is coiled and compressed between the lower portion of the transmission housing and a washer 109 engaging the under surface of the lever so that the latter is normally held with the brake shoe in lower-most disengaged position. On this rod 107 is fixed a collar 111 disposed above the rear end of the brake lever 119, having a pin 112 which secures the collar in place and engages a portion 113 of a brake lever as clearly seen in Figure 9. The upper end of the rod 107 projects externally through a bearing of the transmission housing 9 and has a shoe 35 on its upper end engaged by a cam 34 secured upon the forward end of the tube 32, the latter of which has secured to its rear end adjacent to the control box 26 a laterally projecting arm 33 as seen in Figure 15 which is preferably connected by a pivot 181 with a connecting arm 180 leading to either a hand or foot lever (not shown) disposed within convenient reach of the operator.

Figure 18:
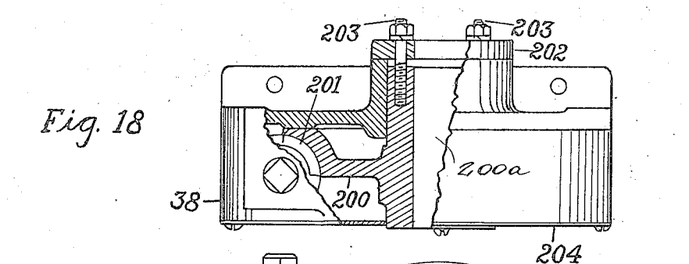
Figures 18 and 19 are respectively a top and side view of certain of the rear wheel adjusting connections, both views being partly broken away and in section.
Figures 19, 20, 21:
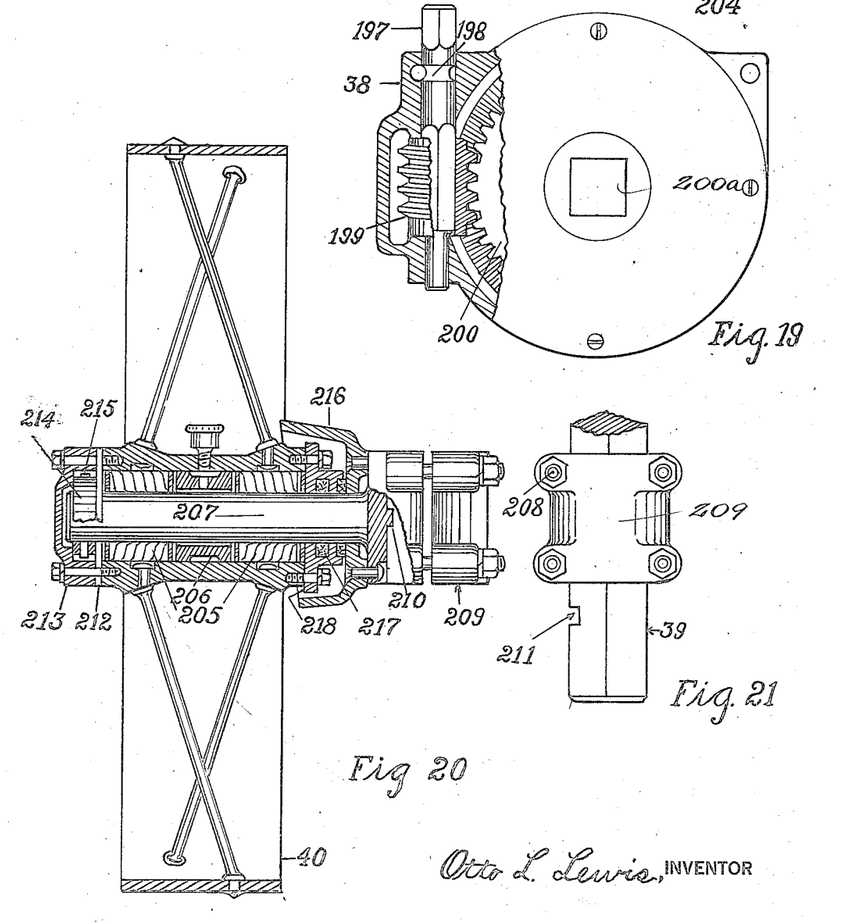
Figure 20 is a sectional view through one of the rear wheels and its adjacent supports.
Figure 21 is a fragmentary view of one of the wheel supporting axles.

Referring again to the rear supporting wheels and to Figures 20 and 21, it will be noted that the inner end of the axle 207 of each of the rear supporting wheels 40 has a clamping member 209 having clamping bolts 208, adapted to embrace and rigidly connect the axle with its respective angular support 39, whose horizontal portion is adjustably mounted through the device shown in Figures 18 and 19 bolted to the respective side of the rear rectangular frame 62 and the respective clamping member 63 of the central frame or torque member 27. On each axle 207 the respective wheel 40 has bearings 205 separated by a spacing and oiling collar 206, the hub of the wheel having at its inner end a washer carrying ring 218 with fiber or other washers 217 protected by a surrounding petticoat 216 attached to the inner flanged end of the axle, the latter of which may have a lug 210 as seen in Figure 20, for engagement with a selected recess 211 of its supporting arm 39 and which cooperates with the clamp 209 to secure the wheel in desired adjustment along the outer angular portion of the supporting arm. At its outer end the axle 207 has a collar 214 secured thereon by a removable pin 215 which abuts a washer 212 disposed against the end of the wheel hub and secured thereto by a cap 213 closing the outer end of the hub for the purpose of holding lubricant therein and preventing entrance of dust, dirt and other foreign matter.

Figure 12:
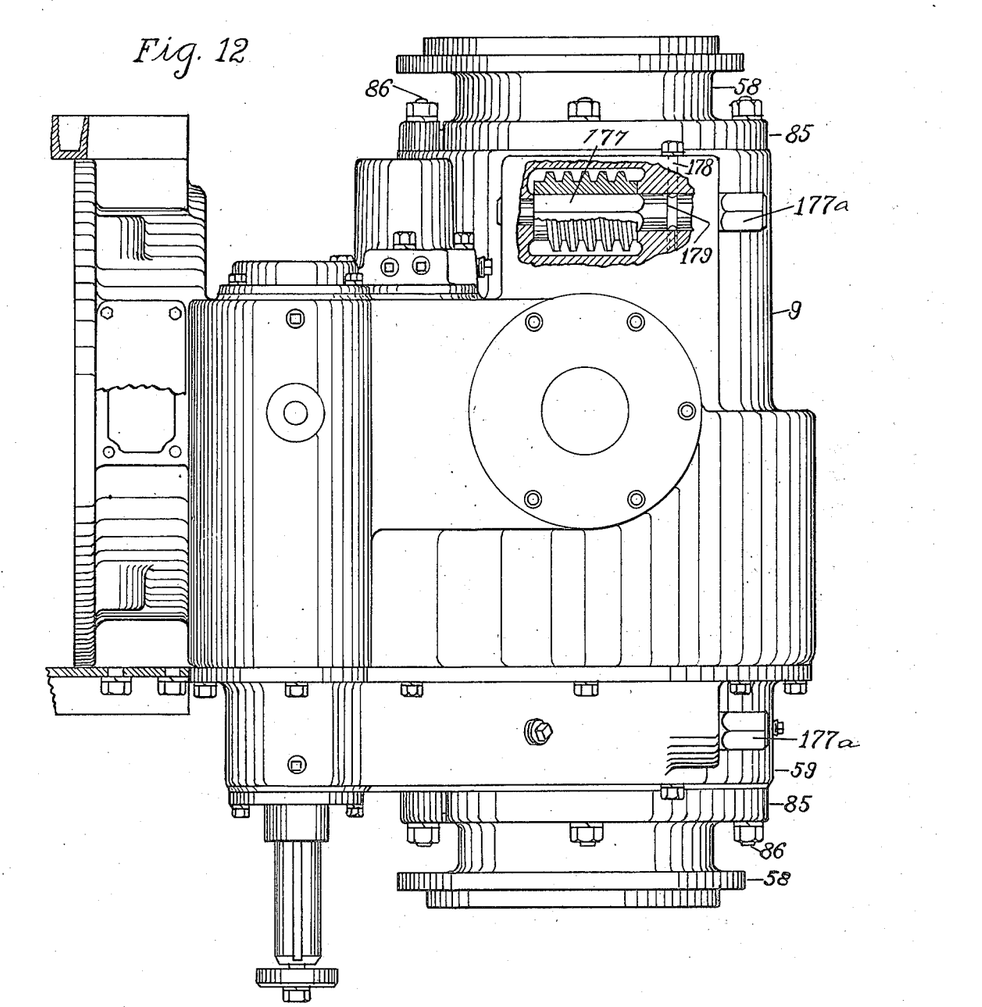
Figure 12 is a top plan view of the transmission case, partly broken away and in section.
Figures 22, 23:
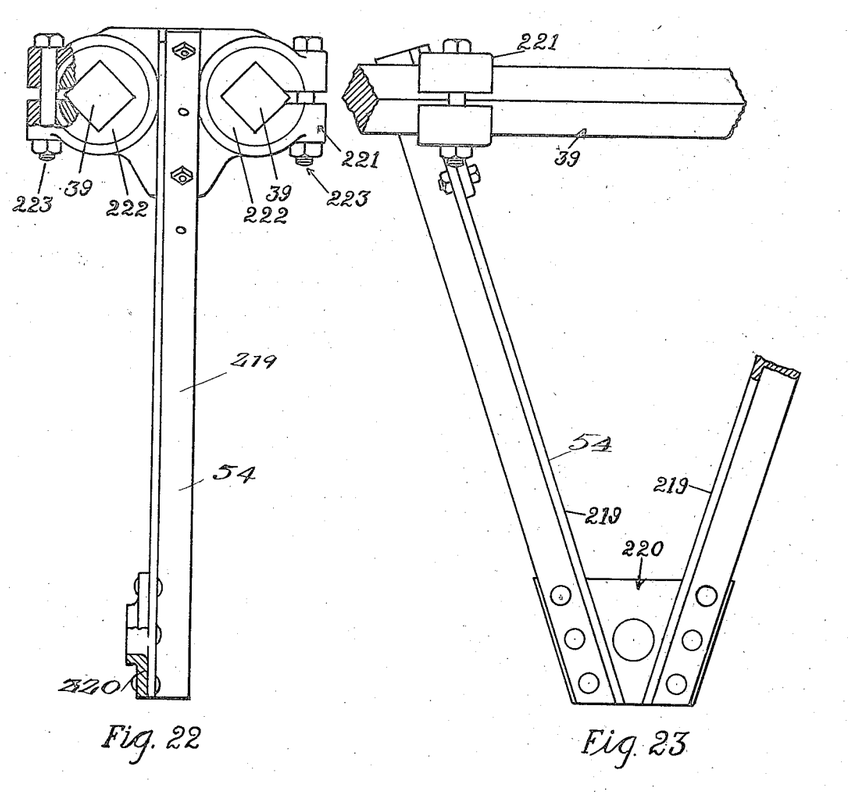
Figure 22 is a side view of the draw bar support.
Figure 23 is a fragmentary end view of the draw bar support.

As seen particularly in Figures 1 and 2 the rear rectangular frame 62 may be provided at the forward and rear portions of its sides with brackets 46 and 47 by which to attach implements of various characters and in addition to the foregoing a draw bar 52, having at its rear end an attaching clevis 52ª for various implements and vehicles, has its front end connected by a bolt 53 to a collar 50 rotatable upon the lower portion of a post 48 rigidly secured to the lower portion of the steering yoke 20 by a bolt 49 and depending below this yoke. Collar 50 is loosely held on the post by a lower cap 51, and the draw bar 52 may be supported adjacent to its rear end and adjacent to the clevis 52ª by passage through the lower apertured cross strap 220 of downwardly converging supporting beams 219. This support is shown in Figures 22 and 23 wherein it will be noted that the upper ends of the supporting beams 219 forming in part the support 54, are adjustably bolted to clamping brackets each having laterally and oppositely outstanding clamps 221, each clamp surrounding a splined collar 222 bored to receive the inner horizontal portions of the rear wheel supporting arms 39. Each clamp 221 is controlled by a clamping bolt 223 by means of which the support 54 may be rigidly set in position. Where the support 54 is used it is obviously necessary to loosen the clamps 221 when loosening the previously described clamps 63ª in adjusting the rear supporting wheels up and down with respect to the frame of the machine, and it is to be understood that the same socket wrench applicable to the worm adjusting shafts 197 for the adjustment of the rear wheels may be utilized upon the external polygonal ends 177ª of adjusting worms 177 of the front driving wheels, seen in Figure 12, wherein it will be noted that these adjusting worms 177 are mounted on annular grooved shafts and the latter held in place by virtue of bolts 178 extending through portions of the transmission housing and into these grooves 179.

Figures 16, 17:
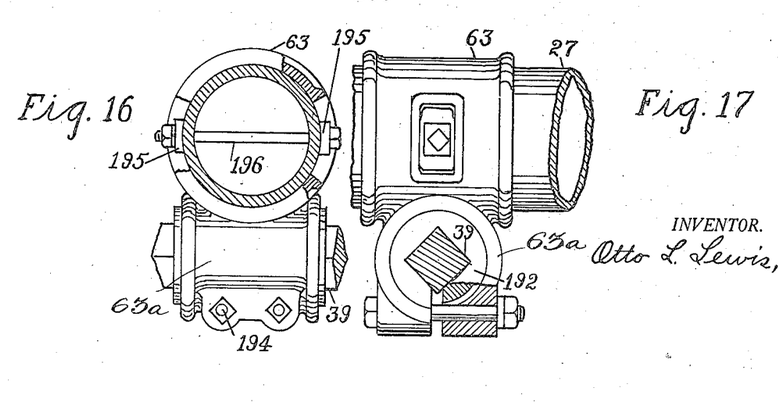
Figures 16 and 17 are detail views partly in elevation and partly in section, of certain connections of the rear wheel supporting members.

As previously stated the front and rear attaching pieces 60 and 61 of the rear frame 62 permit the latter to swivel on the frame or torque member 27 and the clamps 63 for the inner portions of the rear wheel supporting arms 39 are likewise to facilitate this movement although to a limited extent by virtue of side slots 63ª of these clamps as shown in Figures 16 and 17, into which the opposite heads 195 of bolts 196 extending polygonally through the frame or torque member 27 project. It thus becomes obvious that each of the rear wheels can yield to a limited extent in a vertical direction, over rigid obstructions, the extent to which this movement can take place being limited so as to safely avoid all danger of overturning.

I claim:

1. A tractor including a forward motor support, a transmission housing to which said motor support is rigidly fastened, front wheel supports swingingly connected to the sides of the transmission housing, a steering yoke pivotally connected to the upper and lower portions of the transmission housing to form a horizontally swinging steering connection, steering means therefor, and a rear frame rigidly connected to the steering yoke and having swinging rear wheel supports, as described.

2. A tractor having a frame including a forward motor support, a transmission housing to which the motor support is connected, a steering yoke to which the transmission housing is pivotally connected to swing in a horizontal plane, a beam rigidly connected to and extending rearwardly from the steering yoke, front and rear wheels, means supporting the front wheels in vertically adjustable relation with respect to the transmission housing, and means vertically adjustably supporting the rear wheels at opposite sides of said frame beam.

3. A tractor including a front motor support, a gear housing to which the motor support is connected, wheel supports swingingly mounted at the sides of the gear housing, driving connections in the gear housing and the said supports for actuating the front wheels, and a rear frame having hinged connections at its forward portion with the said gear housing and having vertically adjustable wheels in connection therewith, as described.

4. A tractor including a front motor support, a transmission housing to which the rear portion of the motor support is connected, swinging side members pivotally connected at opposite sides of the transmission housing and forming vertically adjustable wheel supports, said wheel supporting members being in the form of frames, driving connections for the front wheels within the said housing and extending through the said wheel supporting frames, and a rear frame having vertically adjustable side wheels and having pivotal connection with the upper and lower portions of the transmission housing for steering purposes, as described.

5. A tractor including a forward driving and steering section having driven side wheels, a rear section having a steering yoke connection with the front section and including rearwardly extending central and side bars, angular arms having their outer portions depending from said side bars and having their inner horizontal portions adjustably journaled in the side bars and the central bar, connections for swinging the said arms and permitting of relative adjustment of the same toward and away from one another, and rear wheels adjustably mounted on the depending outer portions of said arms, as described.

6. A tractor having front and rear wheels, swinging side supports on which the wheels are mounted and with which the wheels are vertically adjustable, said supports of the front wheels being in the form of frames, and driving connections for the front wheels housed in the said frames.

OTTO LEROY LEWIS.